United States Patent
Brizzi

(10) Patent No.: US 11,124,322 B2
(45) Date of Patent: Sep. 21, 2021

(54) HEAD FOR GRASPING AND FOLDING INSERT SHEETS, INSERTING DEVICE, FILLING STATION AND METHOD FOR GRASPING, FOLDING AND LOADING AN INSERT SHEET

(71) Applicant: BOBST MEX SA, Mex (CH)

(72) Inventor: Nicolas Brizzi, Martigny (CH)

(73) Assignee: Bobst Mex SA, Mex (CH)

( * ) Notice: Subject to any disclaimer, the term of this patent is extended or adjusted under 35 U.S.C. 154(b) by 69 days.

(21) Appl. No.: 16/304,441

(22) PCT Filed: May 15, 2017

(86) PCT No.: PCT/EP2017/025127
§ 371 (c)(1),
(2) Date: Nov. 26, 2018

(87) PCT Pub. No.: WO2017/202500
PCT Pub. Date: Nov. 30, 2017

(65) Prior Publication Data
US 2019/0161223 A1 May 30, 2019

(30) Foreign Application Priority Data
May 27, 2016 (EP) .................................... 16020195

(51) Int. Cl.
*B65B 43/10* (2006.01)
*B25J 15/00* (2006.01)
(Continued)

(52) U.S. Cl.
CPC ........... *B65B 43/10* (2013.01); *B25J 15/0061* (2013.01); *B25J 15/0658* (2013.01);
(Continued)

(58) Field of Classification Search
CPC ....... B65B 43/10; B65B 43/185; B65B 43/52; B65B 43/18; B65B 5/108; B65B 25/143;
(Continued)

(56) References Cited

U.S. PATENT DOCUMENTS

| 3,889,580 A | 6/1975 | Garst |
| 4,656,815 A | 4/1987 | Jaton |

(Continued)

FOREIGN PATENT DOCUMENTS

| CH | 659627 | 2/1987 |
| CN | 101439479 A | 5/2009 |

(Continued)

OTHER PUBLICATIONS

International Search Report issued in related PCT/EP2017/025127 (dated Jun. 20, 2017) (6 pages).

*Primary Examiner* — Hemant Desai
*Assistant Examiner* — Christopher Robin Kim
(74) *Attorney, Agent, or Firm* — Bookoff McAndrews, PLLC

(57) ABSTRACT

The invention relates to a gripping head (15) for insert sheets (11) for inserting between rows of folding boxes (3) in a receptacle (2), characterized in that it comprises:
- at least one first aspiration element (17a, 17b) designed to grasp an insert sheet (11),
- at least one second aspiration element (18a, 18b) designed to grasp an insert sheet (11),
- at least one linear element (19a, 19b) on which at least the first aspiration element (17a, 17b) is mounted and able to slide,
- a controllable actuating mechanism (20), designed to displace at least the first aspiration element (17a, 17b) by sliding on the at least one linear element (19a, 19b) into a position of grasping in which the at least one first (Continued)

aspiration element (17a, 17b) and the at least one second aspiration element (18a, 18b) are positioned at a spacing from each other in order to grasp an insert sheet (11).

12 Claims, 6 Drawing Sheets

(51) Int. Cl.
| | |
|---|---|
| *B31D 5/00* | (2017.01) |
| *B65B 25/14* | (2006.01) |
| *B65B 41/06* | (2006.01) |
| *B65B 43/18* | (2006.01) |
| *B65B 43/52* | (2006.01) |
| *B65B 61/20* | (2006.01) |
| *B65B 61/22* | (2006.01) |
| *B65G 47/91* | (2006.01) |
| *B65B 5/10* | (2006.01) |
| *B65H 3/08* | (2006.01) |
| *B25J 15/06* | (2006.01) |
| *B65B 5/08* | (2006.01) |
| *B65B 35/18* | (2006.01) |

(52) U.S. Cl.
CPC ............. *B31D 5/0004* (2013.01); *B65B 5/08* (2013.01); *B65B 5/108* (2013.01); *B65B 25/14* (2013.01); *B65B 25/143* (2013.01); *B65B 35/18* (2013.01); *B65B 41/06* (2013.01); *B65B 43/185* (2013.01); *B65B 43/52* (2013.01); *B65B 61/207* (2013.01); *B65B 61/22* (2013.01); *B65G 47/912* (2013.01); *B65H 3/0816* (2013.01); *B65H 3/0883* (2013.01); *B65H 2406/342* (2013.01); *B65H 2406/343* (2013.01); *B65H 2701/1827* (2013.01)

(58) Field of Classification Search
CPC ....... B65B 41/06; B65B 61/207; B65B 61/22; B65B 35/18; B65B 59/001; B65B 59/003; B65B 5/08; B65B 5/10; B65B 5/105; B65B 5/12; B65B 25/14; B65B 25/141; B65B 61/20; B25J 15/0061; B25J 15/0658; B31D 5/0004; B65G 47/912; B65H 3/0816; B65H 3/0883; B65H 2406/342; B65H 2406/343; B65H 2701/1827; B31B 50/022; B31B 50/024; B31B 50/07; B31B 70/02; B31B 70/022; B31B 70/024; B31B 70/982
USPC ... 53/475, 235, 255, 263, 115, 386.1, 381.6, 53/157, 284.4, 473, 247, 156, 445, 474, 53/237, 238, 244, 248, 259; 294/65, 185, 294/183, 188; 414/788, 791.5, 800, 802; 271/91, 92
See application file for complete search history.

(56) References Cited

U.S. PATENT DOCUMENTS

| | | | | |
|---|---|---|---|---|
| 4,787,812 A * | 11/1988 | Gopfert | ................. | B66C 1/0212 414/737 |
| 5,433,426 A * | 7/1995 | Bond | ................... | B65H 3/0816 271/104 |
| 5,655,355 A * | 8/1997 | Ramler | ................... | B65B 5/105 53/244 |
| 5,733,097 A * | 3/1998 | Herbermann | ........ | B21D 43/055 294/65 |
| 7,611,180 B1 * | 11/2009 | Fisher | ................. | B25J 15/0052 294/65 |
| 7,644,558 B1 * | 1/2010 | Fallas | .................... | B25J 9/0093 53/251 |
| 8,146,972 B2 * | 4/2012 | Petijean | ................ | B65B 43/305 294/186 |
| 8,684,418 B2 * | 4/2014 | Lin | ...................... | B25J 15/0061 285/147.1 |
| 8,857,877 B2 * | 10/2014 | Lin | ...................... | B25J 15/0616 294/213 |
| 8,899,650 B2 * | 12/2014 | Furuta | .................. | B65G 47/918 294/188 |
| 2004/0094979 A1 * | 5/2004 | Damhuis | .............. | B25J 15/0052 294/65 |
| 2008/0121537 A1 | 5/2008 | Sankaran | | |
| 2009/0133524 A1 | 5/2009 | Fukano et al. | | |
| 2012/0126554 A1 * | 5/2012 | Becker | ..................... | A01C 7/04 294/64.3 |
| 2014/0102044 A1 * | 4/2014 | Berglin | .................. | B65B 43/10 53/452 |
| 2016/0325438 A1 * | 11/2016 | Li | ......................... | B25J 15/0052 |
| 2017/0081134 A1 * | 3/2017 | Aldazabal Badiola | ..................... | B65G 61/00 |

FOREIGN PATENT DOCUMENTS

| | | | |
|---|---|---|---|
| DE | 197 20 650 A1 | 11/1998 | |
| DE | 19720650 A1 * | 11/1998 | ........... B65B 25/141 |
| DE | 102008057246 A1 * | 5/2010 | ........... B25J 15/0061 |
| DE | 2394800 A1 * | 12/2011 | .............. B25J 15/02 |
| EP | 2394800 A1 * | 6/2010 | |
| EP | 2 394 800 A1 | 12/2011 | |
| EP | 2394800 A1 * | 6/2020 | |
| FR | 2 816 232 A1 | 5/2002 | |
| JP | H02-30553 U | 2/1990 | |
| JP | H03-12182 U | 2/1991 | |
| JP | H09-315405 A | 12/1997 | |
| JP | 3751683 B2 | 3/2006 | |
| JP | 3153048 U | 8/2009 | |
| JP | 2010-280406 A | 12/2010 | |
| WO | 02/38342 A1 | 5/2002 | |
| WO | WO0238342 * | 5/2002 | |

\* cited by examiner

HEAD FOR GRASPING AND FOLDING INSERT SHEETS, INSERTING DEVICE, FILLING STATION AND METHOD FOR GRASPING, FOLDING AND LOADING AN INSERT SHEET

CROSS-REFERENCE TO RELATED APPLICATION(S)

This application is a National Stage under 35 U.S.C. § 371 of International Application No. PCT/EP2017/025127, filed on May 15, 2017, which claims priority to European Patent Application No. 16020195.0, filed on May 27, 2016, the contents of all of which are incorporated by reference in their entirety.

The present invention relates to a gripping head for insert sheets for inserting between rows of folding boxes in a receptacle, the folding boxes being produced in particular by a folder-gluer machine. The invention also relates to a gripping and folding head for in insert to be inserted between rows of folding boxes in a receptacle. The invention likewise relates to an inserting device, a station for filling receptacles with folding boxes and a method for grasping, folding and loading an insert sheet.

Folder-gluer machines glue and fold flat the folding boxes which will contain products such as blister packs for drugs or other products, for example those packaged by a third-party industry. The boxes folded flat may then be stored effectively in receptacles (also known as containers) for delivery to manufacturers.

Document CH 659627 describes an example of a device for filling receptacles with folding boxes coming from a folder-gluer machine. The folded boxes are then placed in a sheet and delivered by a box conveyor to a receptacle. Each receptacle may contain a significant number of folded boxes, such as several dozens or hundreds of boxes.

In order to form separated and stable rows of folding boxes in the receptacle, an inserting process is required. The inserting consists in arranging an insert in the empty receptacle to form a partition between the rows of folding boxes. This operation of inserting an insert is necessary to prevent the boxes from crossing over, for example, during the transporting of the filled receptacle. When the end customer receives the receptacle filled with boxes, they should be able to very easily grab and pick up the rows of boxes.

The insert sheet is a sheet of creased and sliced cardboard, generally so as to preform three parallel folding lines. The crease lines may likewise be preformed by a half cut or dotted cut. The insert sheet may likewise be a plain sheet of flat cardboard with dimensions corresponding to the dimensions of the bottom of the receptacle.

When the two lateral flaps of the insert sheet are placed against each other, the insert sheet has a three-dimensional shape with a planar fold substantially perpendicular to the flaps. The dimension of the flaps corresponds to the dimension of the bottom of the receptacle such that when the folded insert sheet is placed in the receptacle, the planar fold is positioned vertically.

In production, at the end of the process a worker is assigned to insert manually a vertical separation sheet between two rows of boxes. The boxes are then arranged on either side of the vertical separation sheet.

However, this inserting operation may prove to be unpleasant and tiresome to the worker due to the repetitive nature of the task. Moreover, the worker often has trouble properly separating the rows of boxes. The involvement of a worker may limit the production tempo. In fact, a folder-gluer machine can supply a filling station at a tempo of 200000 boxes an hour. The worker will not be able to keep up with this tempo imposed by the folder-gluer machine, which may result in jams at the end of the line, or even in the total shutdown of the folder-gluer machine.

SUMMARY OF THE INVENTION

One of the goals of the present invention is to propose a device and a method for the grasping, the folding and the loading of a folded insert sheet in a receptacle allowing the solving of at least some of the aforementioned drawbacks, especially by avoiding the involvement of a worker.

For this purpose, the subject matter of the present invention is a gripping head for insert sheets for inserting between rows of folding boxes in a receptacle, characterized in that it comprises:
  at least one first aspiration element designed to grasp an insert sheet,
  at least one second aspiration element designed to grasp an insert sheet,
  at least one linear element on which at least the first aspiration element is mounted and able to slide,
  a controllable actuating mechanism, designed to displace at least the first aspiration element by sliding on the at least one linear element into a position of grasping in which the at least one first aspiration element and the at least one second aspiration element are positioned at a spacing from each other in order to grasp an insert sheet.

Thus, the inserting can be done automatically at a high tempo without requiring the involvement of a worker. The insert sheets may thus be folded rapidly and correctly to be placed in the proper direction into the receptacles.

The gripping head comprises a controllable actuating mechanism designed to displace at least the first aspiration element by sliding on the at least one linear element between:
  a grasping position in which the at least one first aspiration element and the at least one second aspiration element are positioned at a spacing from each other in order to grasp an insert sheet; and
  a folding position in which the at least one first aspiration element and the at least one second aspiration element are brought close together as compared to the grasping position to fold the insert sheet.

According to one or more characteristics of the gripping and folding head, taken alone or in combination:
  the actuating mechanism is likewise designed to displace the second aspiration element(s) by sliding on the at least one linear element between the grasping position and the folding position.
  the gripping and folding head comprises:
  at least two first aspiration elements,
  at least two second aspiration elements,
  at least a first and a second linear element, one of the first aspiration elements being mounted able to slide on the first linear element and another of the first aspiration elements being mounted able to slide on the second linear element,
    the actuating mechanism being designed to displace at least the two first aspiration elements by sliding on the first and the second linear elements,
  the gripping and folding head comprises at least two first aspiration elements joined together by a first support bar and at least two second aspiration elements joined together by a second support bar, the actuating mechanism comprises a controllable actuator and a system of connecting rods comprising:
    a vertically movable transverse axle, connected to the controllable actuator, and
    at least one connecting rod whose:
        first end is pivotably connected to the transverse axle, and
        whose second end is pivotably connected to the at least one first aspiration element.
    the controllable actuator comprises an electric motor and the actuating mechanism comprises a screw designed to be driven in rotation by the electric motor, the screw being inserted into a thread of the transverse axle such that a rotation in a first direction of the electric motor causes a raising of the transverse axle and a rotation in the opposite direction causes a lowering of the transverse axle,
    the actuating mechanism comprises at least one guide groove designed to cooperate with one end of the transverse axle to guide the vertical displacement of the transverse axle.

The invention also relates to an inserting device for insert sheets characterized in that it comprises a gripping and folding head as described above.

The inserting device may comprise a means of controllable displacement designed to displace the gripping and folding head at least in a vertical movement and in a horizontal movement.

The inserting device may comprise a control unit designed to control the means of controllable displacement and/or the actuating mechanism and/or the creating of a vacuum in the first and second aspiration elements of the gripping and folding head.

The invention also relates to a filling station for the filling of receptacles with folding boxes, characterized in that it comprises an inserting device for insert sheets as described above.

The invention also relates to a method of grasping, folding and loading of an insert sheet by an inserting device as described above, wherein:
    the gripping and folding head is positioned above an insert sheet, the first and second aspiration elements being positioned at a spacing from each other in the grasping position.
    a vacuum is created in the first and second aspiration to grasp the insert sheet.
    the head is lifted and directed toward a receptacle,
    at least a first aspiration element is slid so as to position the aspiration elements in a folding position so as to fold the insert sheet,
    the gripping and folding head carrying the folded insert sheet is positioned in the receptacle,
    the vacuum is curtailed in the first and second aspiration elements so as to release the folded insert sheet in the receptacle.

The folding of the insert sheet can be accomplished in flight during the transporting of the insert sheet to the receptacle.

SUMMARY DESCRIPTION OF THE DRAWINGS

Other advantages and characteristics will emerge upon reading the specification of the invention, as well as from the enclosed figures representing an exemplary nonlimiting embodiment of the invention in which:

FIG. 8a shows a side view of the gripping and folding head of FIG. 7a;

In these figures, identical elements carry the same reference numbers. The following embodiments are examples. Even though the description pertains to one or more embodiments, this does not necessarily mean that each reference involves the same embodiment, or that the characteristics apply only to a single embodiment. Single characteristics of different embodiments may likewise be combined or interchanged to provide other embodiments.

Figure 5:
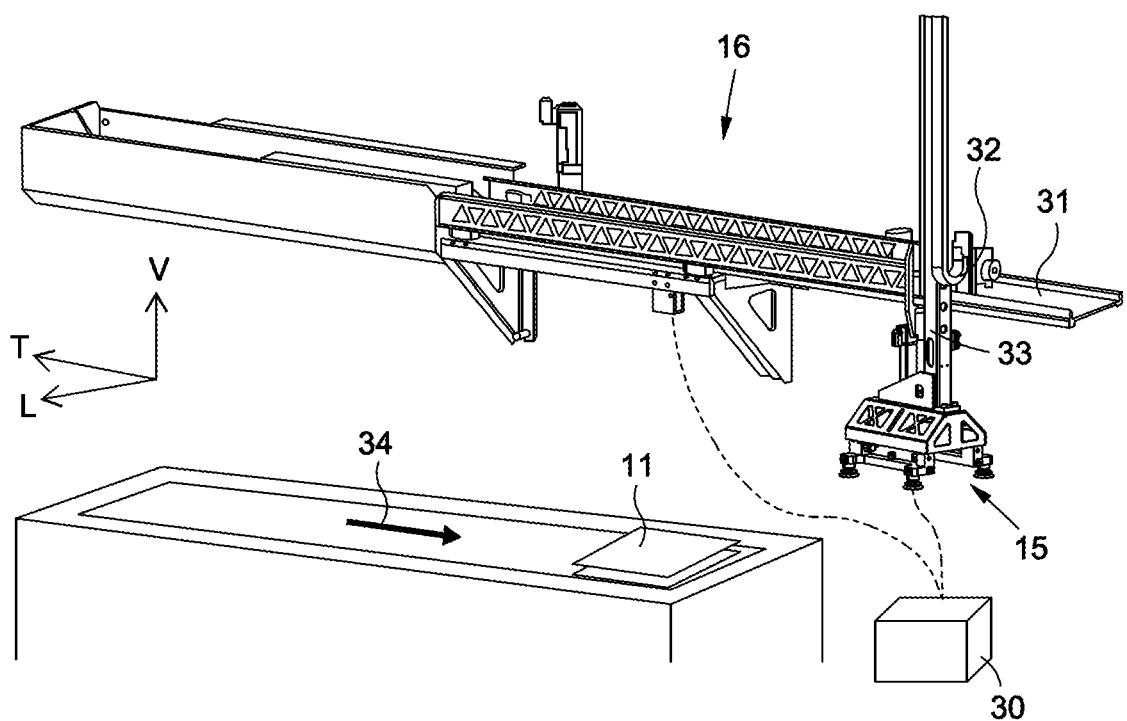
FIG. 5 shows a perspective view of the inserting device of FIG. 1.

The longitudinal, vertical and transverse directions indicated in particular in FIG. 5 shall be denoted by the triplet (L, V, T). The horizontal plane corresponds to the plane (L, T).

The terms "upper" and "lower" are defined with regard to the disposition of the elements in a filling station placed on the floor.

EXAMPLES OF EMBODIMENTS OF THE INVENTION

Figure 1:
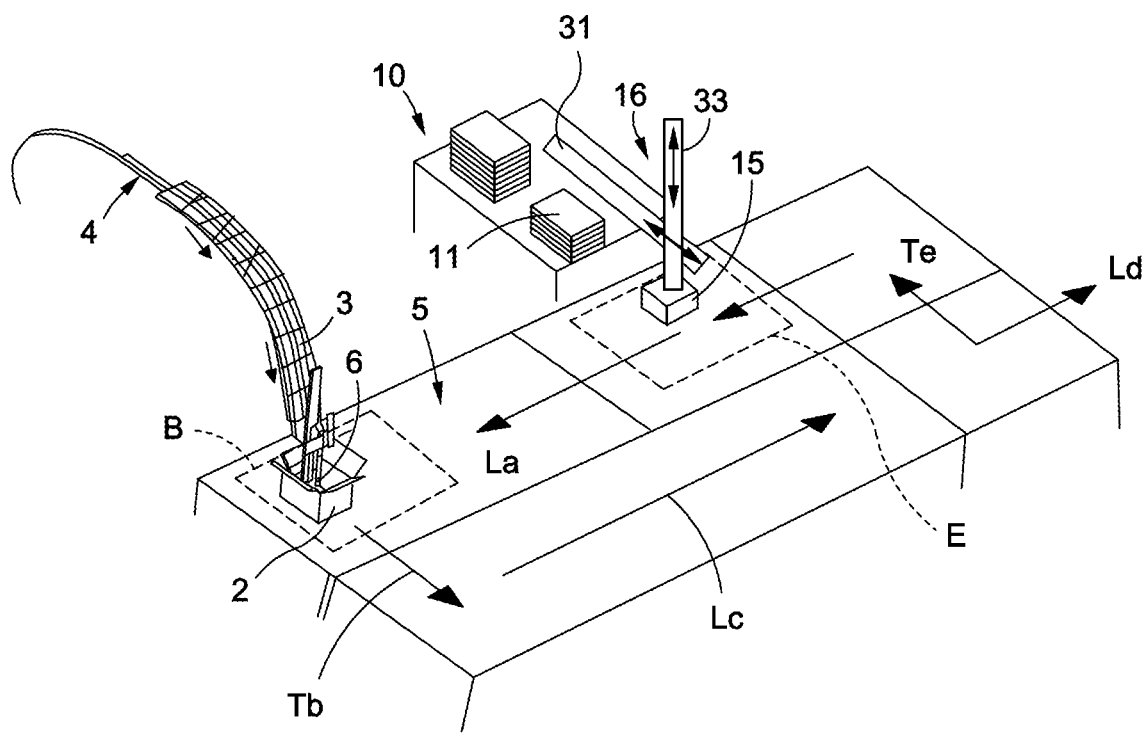
FIG. 1 shows elements of a filling station, in particular a box conveyor/filler, a receptacle conveyor, and an inserting device.

FIG. 1 shows a general view of the elements of a station 1 for filling of receptacles 2 (also known as containers) with folding boxes 3, the station 1 being possibly placed at the exit of a folder-gluer machine.

The folding boxes 3 may be prepared by a folder-gluer machine which glues and folds the boxes 3 flat, which can then be stockpiled, in the folded and glued state, with a slight footprint in receptacles 2 for the purpose of being transported. The term "folding box" here denotes the folding boxes folded flat in order to be arranged in a receptacle 2.

Figures 2A, 2B:
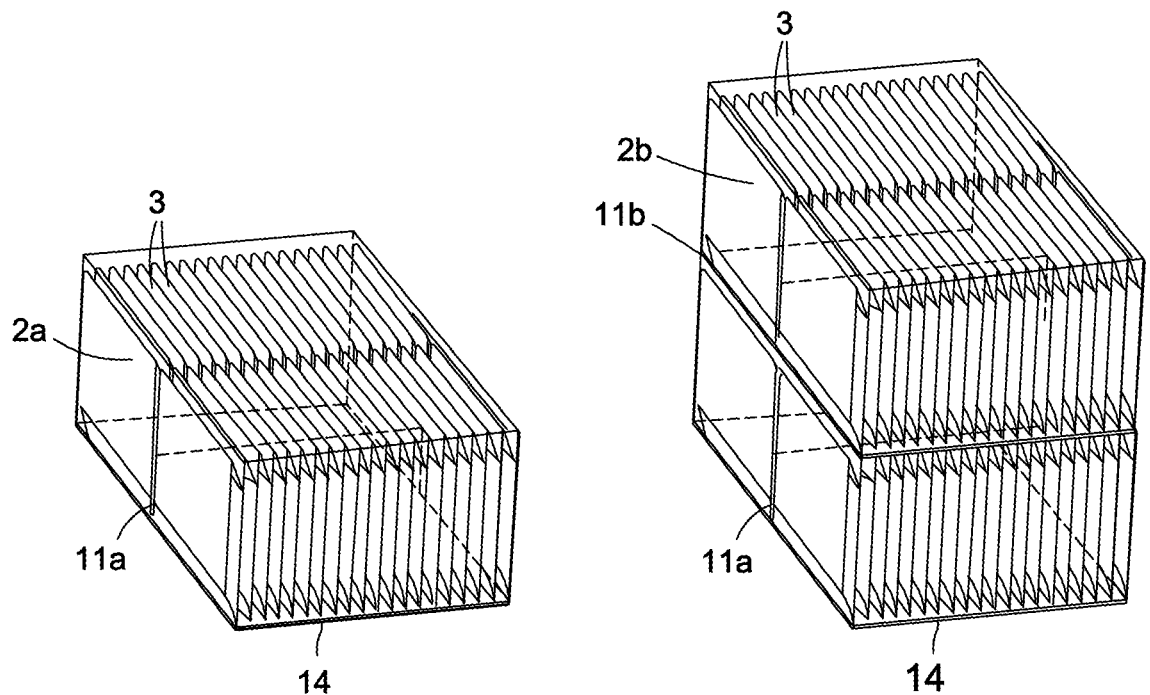
FIG. 2a shows an example of a receptacle whose side walls are shown as transparent, the receptacle being loaded with folding boxes arranged in orderly manner with a folded insert sheet inserted between the two rows of boxes.
FIG. 2b shows another example of a receptacle whose side walls are shown as transparent, the receptacle being loaded with folding boxes arranged in orderly manner with a folded insert sheet inserted between the two rows of boxes, and with two levels of folding boxes, a folded insert sheet being inserted between two levels.

The receptacle 2 is a box of parallelepiped form, able to hold a plurality of folding boxes 3. For example, the receptacle 2 is made of cardboard. A receptacle 2 filled with two rows of folding boxes 3 positioned on the edge is shown as an illustration in FIG. 2a.

At a filling station 1, such as can be seen in FIG. 1, a conveyor of receptacles 5 delivers, for example by means of a roller train, empty receptacles 2 to a filling zone B where the receptacles 2 are loaded with folding boxes 3. Once loaded, the receptacle 2 is moved from the filling zone B on an evacuation section Lc (arrow Tb), for example with the aid of a push system. The loaded receptacles 2 are then evacuated to an exit 7 along the evacuation section Lc, for example, in parallel with the delivery section La, transporting the receptacle 2 to the filling zone B, but in the opposite direction. The loaded receptacles 2 are evacuated to the outside of the conveyor 5 (arrow Ld).

According to one variant embodiment, the receptacles 2b can carry out a new loading cycle by being reintroduced at the start of the conveying to carry out a new loading with a second level of boxes (arrow Te). The receptacle 2b has a capacity and thus a greater height to allow the entry of the second level of boxes (see FIGS. 2a and 3c).

Figure 3A:
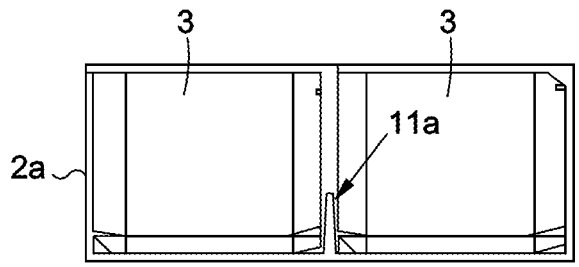
FIGS. 3a and 3b show a cross sectional view of the receptacle, the folding boxes and the insert sheets of FIGS. 2a and 2b.

A box transporter-filler 4 is designed to grasp the folding boxes 3, arranged for example in a sheet at the exit from the folder-gluer machine, and to transfer them to the filling zone B. The folding boxes 3 having traveled a substantially arc-shaped path are arranged in orderly manner in a receptacle 2 by means of the movable end 6 of the box transporter-filler 4. The folding boxes 3 are thus generally arranged in at least two rows of boxes 3 alongside each other, vertically straightened, the rows being separated by a folded insert sheet 11a (FIG. 3a).

Figure 3B:
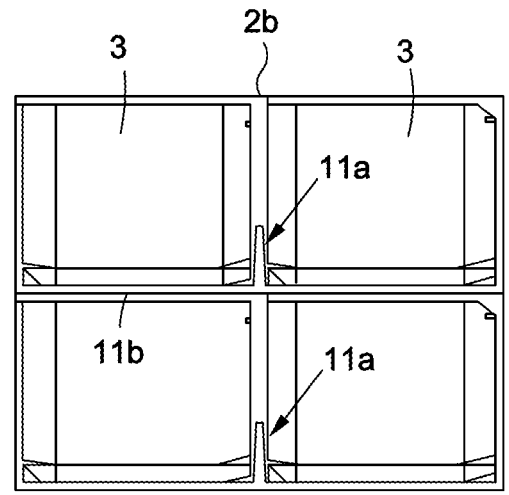
Figure 4A:
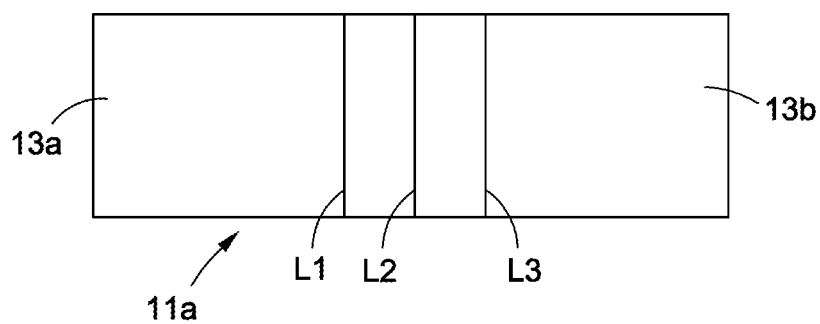
FIG. 4a shows a diagram of an insert sheet before folding, seen from above.
Figure 4B:
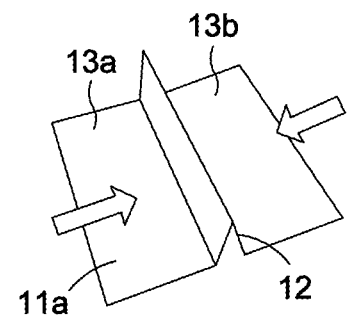
FIG. 4b shows a perspective view of the insert sheet of FIG. 4a during the folding process.

The insert sheet 11a is a sheet of cardboard, for example, creased to preform at least three folding lines L1, L2, L3 (FIG. 4a). The folding lines L1, L2, L3 are parallel to each other. Once folded, the insert sheet 11a has a planar fold 12 perpendicular to a planar base formed by two lateral flaps 13a, 13b of the insert sheet 11a, placed one against the other by folding (FIG. 4b). The insert sheet 11a is dimensioned so that, once folded, the planar base has dimensions complementary to those of the bottom 14 of the receptacle 2 (FIG. 3a, 3b). The folding lines L1, L2, L3 for example are centered so that the planar fold 12 is in the center, and then the cross section of the folded insert sheet 11a placed on its base will have an inverted T shape.

Other forms of folding may be contemplated for the insert sheet 11.

The insert sheet 11b may likewise be a sheet of cardboard, for example, lying flat to separate two levels of boxes 2.

For example, the planar fold 12 of the folded insert sheet 11 need not be central, the folded insert sheet 11 having an asymmetrical three-dimensional shape. This type of insert may be of interest, for example, in the event that the folding boxes 3 are arranged in one direction in one row and in the other direction in the other row.

According to another example, the insert sheet 11 has two by three folding lines parallel to each other, separated to form a folded insert sheet 11 having two planar folds 12 parallel to each other. The boxes 3 are then arranged in three rows in the receptacle 2.

The filling station 1 comprises an inserting device 10 making it possible to grasp an insert sheet 11 from a stack, fold the insert sheet 11 along the folding lines L1, L2, L3, and then arrange the folded insert sheet 11 in an empty receptacle 2 before it is filled with folding boxes 3. These operations, also known as "inserting", make it possible to separate and maintain the folding boxes 3 in the receptacle 2 in a least two firmly stable rows.

For this, the inserting device 10 comprises a gripping and folding head 15 and a means of controllable displacement 16 designed to displace the gripping and folding head 15 at least along a vertical movement, such as a straight line, and a horizontal movement, for example another straight line.

The inserting device 10 likewise comprises a mat making it possible to bring up successive packs of inserts in order to ensure a nonstop inserting operation. While the last insert of a pack is grabbed and inserted into the receptacle, the mat advances and brings up the next insert pack.

Figure 6:
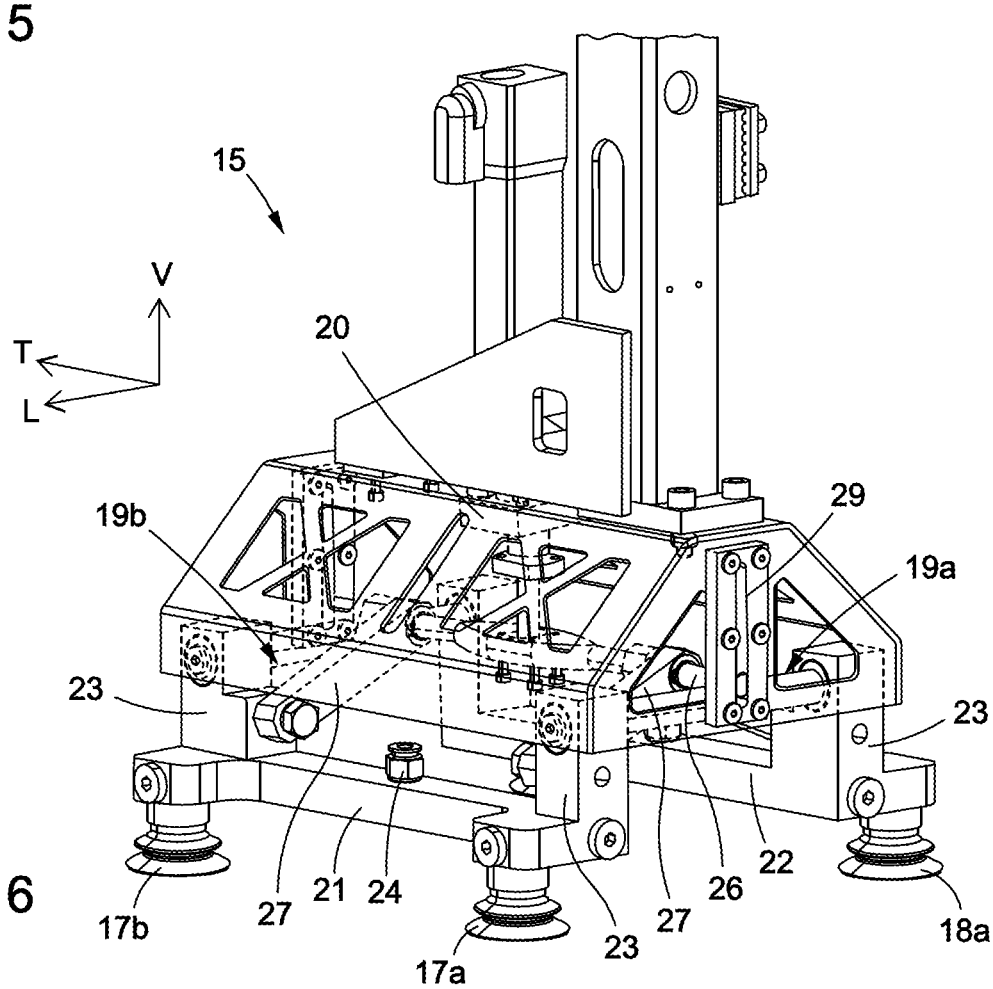
FIG. 6 shows a perspective view of a gripping and folding head of the inserting device of FIG. 5 with hood elements shown as being transparent, the aspiration elements being represented in the grasping position.

Better seen in FIG. 6, the gripping and folding head 15 comprises at least one first aspiration element 17a, 17b, at least one second aspiration element 18a, 18b, at least one linear element 19a, 19b on which is mounted and able to move by sliding at least the first aspiration element 17a, 17b, as well as a controllable actuating mechanism 20.

In the example represented in FIG. 6, 7a, 7b, 8a, 8b, 9, the gripping and folding head 15 comprises two first aspiration elements 17a, 17b, two second aspiration elements 18a, 18b and two linear elements 19a, 19b. One of the first aspiration elements 17a and one of the second aspiration elements 18a are mounted to slide on the first linear element 19a. The other of the first aspiration elements 17b and the other of the second aspiration elements 18b are mounted to slide on the second linear element 19b.

The aspiration elements 17a, 17b, 18a, 18b are designed to grasp an insert sheet 11. They comprise respective supports 23, for example, in the form of a bracket, at the lower ends of which are arranged aspiration openings. These aspiration openings are situated in a horizontal plane.

The aspiration openings are connected to a vacuum source, for example, by means of flexible hoses and at least one valve. The valve, for example a controllable valve, may be located between the vacuum source and the flexible hoses and may be controlled by a control unit 30 in order to establish or cut off a low pressure in the aspiration openings. Thus, when a vacuum is transmitted to the aspiration openings, an insert sheet 11 can be grasped by suction.

The aspiration elements 17a, 17b, 18a, 18b may likewise comprise suction cups, arranged in the area of the aspiration openings, in order to facilitate the grasping of the insert sheet 11 by improving the tightness between the insert sheet 11 and the aspiration openings.

Figure 7A:
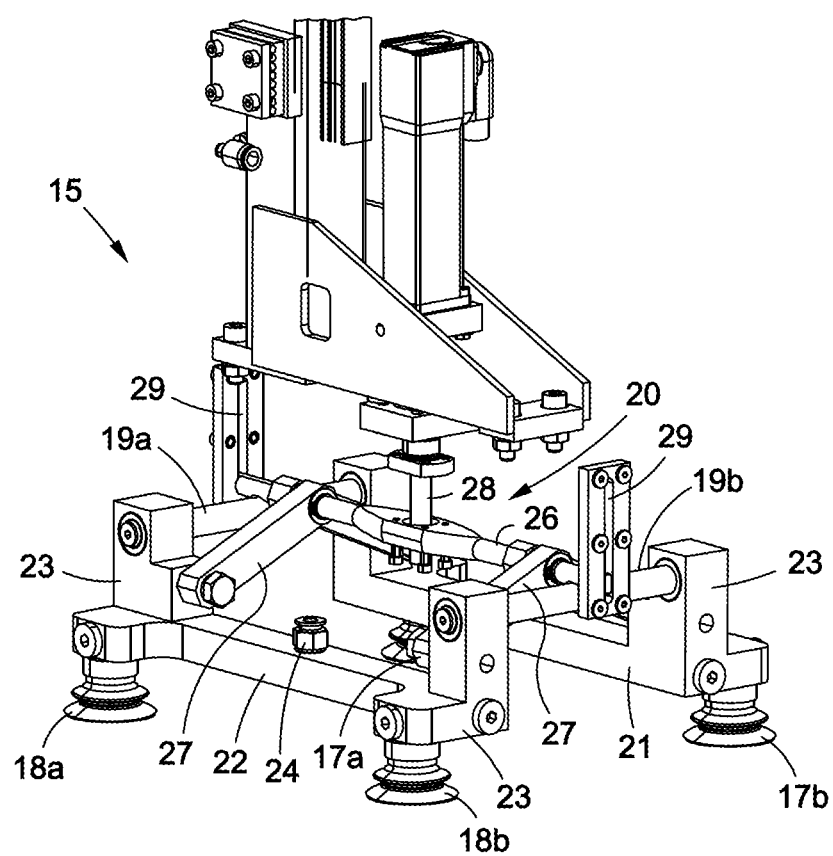
FIG. 7a shows a view of the gripping and folding head of FIG. 6 where the hood elements have been removed to better display an actuating mechanism.
Figure 7B:
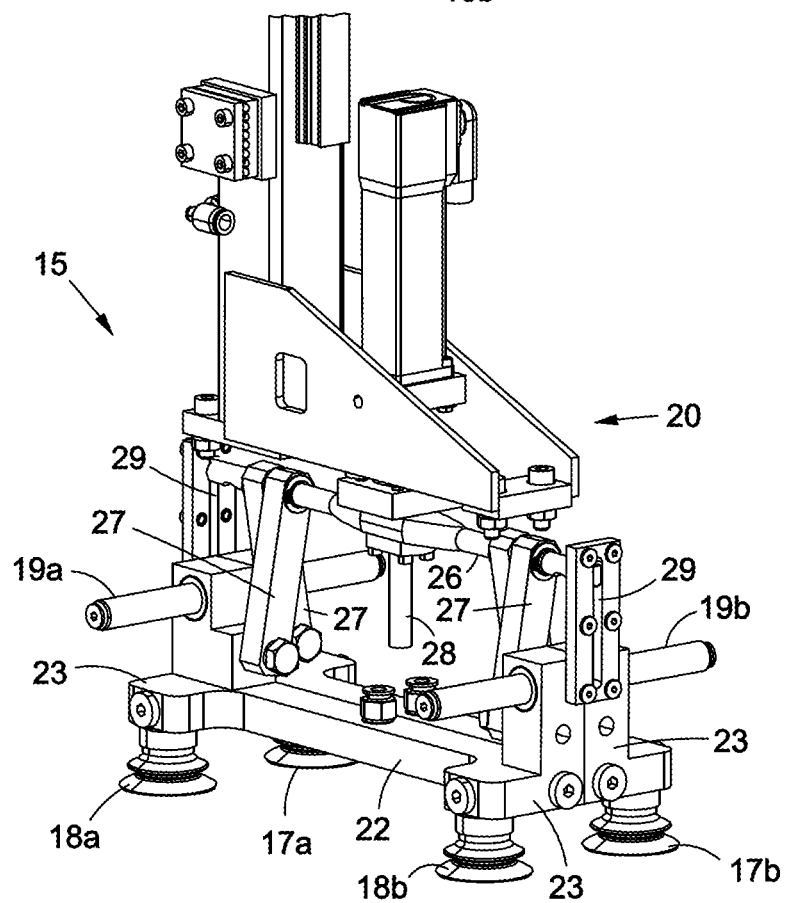
FIG. 7b shows a view similar to FIG. 7a with the aspiration elements in the folding position.
Figure 8A:
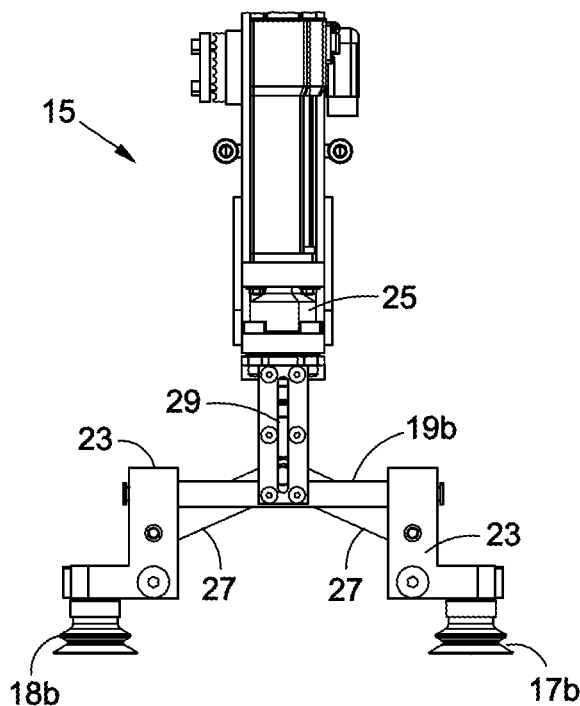
Figure 8B:
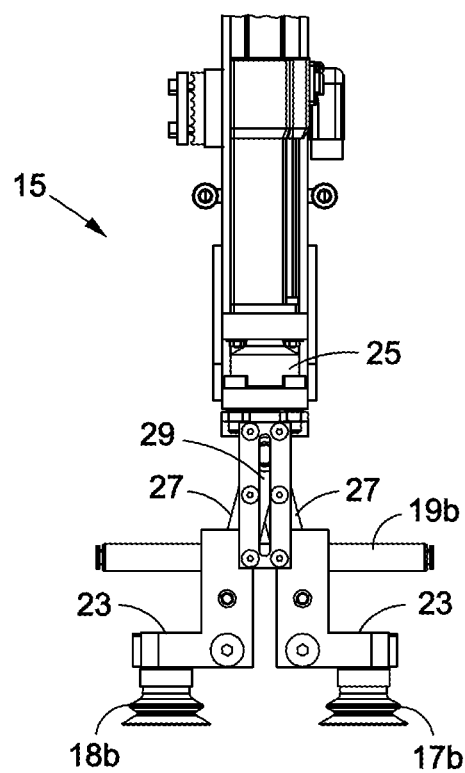
FIG. 8b shows a side view of the gripping and folding head of FIG. 7b.
Figure 9:
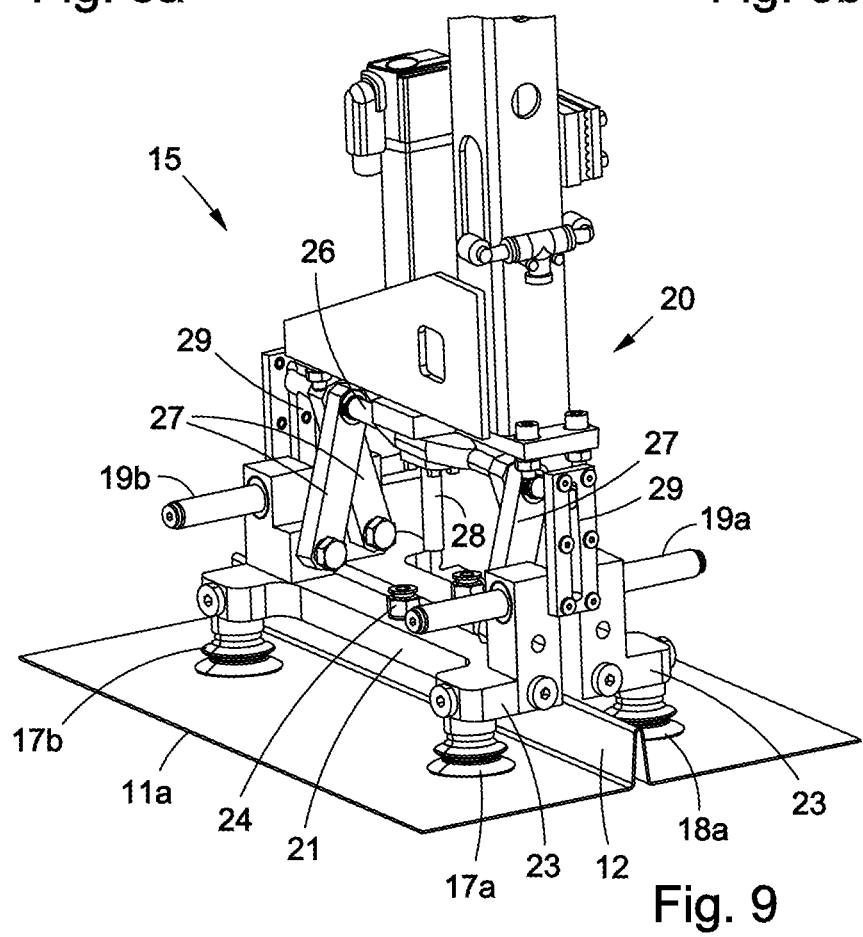
FIG. 9 shows a perspective view of the gripping and folding head of FIG. 7b having pivoted 180° and carrying a folded insert sheet.
Figure 10:
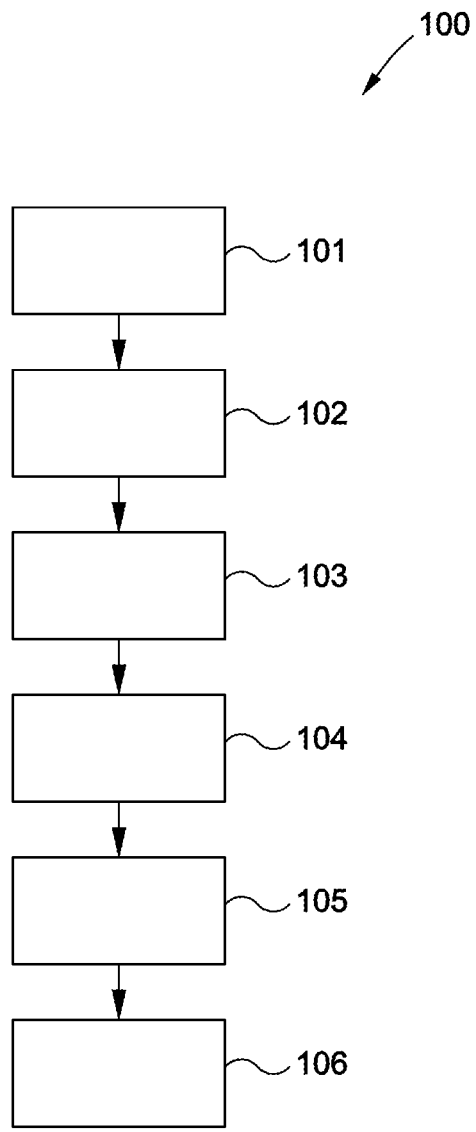
FIG. 10 shows a flow chart of the various steps of a process of grasping, folding and loading of an insert sheet by means of the inserting device of FIG. 5.

At least the first aspiration elements 17a, 17b can be displaced by sliding on the linear elements 19a, 19b by the actuating mechanism 20 between a grasping position (FIGS. 7a, 8a and 6) a folding position (FIGS. 7b, 8b and 9).

In the grasping position (FIGS. 7a, 8a and 6), the first aspiration elements 17a, 17b and the second aspiration elements 18a, 18b are positioned at a spacing from each other. This position allows the aspiration elements 17a, 17b, 18a, 18b to be able to grasp an insert sheet 11 lying flat, by suction of the lateral flaps 13a, 13b.

In the folding position (FIGS. 7b, 8b and 9), the first aspiration elements 17a, 17b and the second aspiration elements 18a, 18b are brought closer together as compared to the grasping position. This coming closer of the aspiration elements 17a, 17b, 18a, 18b makes it possible to fold the insert sheet 11. A gap is devised between the supports 23 of the aspiration elements 17a, 17b, 18a, 18b in particular to avoid wedging the central planar fold 12 (FIGS. 8b and 9).

According to one exemplary embodiment, the two first aspiration elements 17a, 17b are joined together by a first support bar 21 and the two second aspiration elements 18a, 18b are joined together by a second support bar 22. The support bars 21, 22 make it possible to ensure a good stability for the aspiration elements 17a, 17b, 18a, 18b as well as good planarity of the aspiration openings. A duct may be devised in the support bars 21, 22 to connect the aspiration openings to each other and to a common connection 24 of each bar 21, 22, to which a flexible hose connected to the pump may be connected.

In this example, the actuating mechanism 20 is designed to likewise displace the second aspiration elements 18a, 18b by sliding on the linear elements 19a, 19b between the grasping position and the folding position. The actuating mechanism 20 in particular may be designed to allow a simultaneous displacement of the same amplitude of the support bars 21, 22 toward each other, which enables the folding of an insert sheet 11 with a central planar fold 12.

The linear elements 19a, 19b on which the aspiration elements 17a, 17b are mounted to slide comprise for example one cylindrical rod each. Complementary cylindrical holes are devised, for example, in the uprights of the supports 23 of the aspiration elements 17a, 17b, 18a, 18b.

According to one exemplary embodiment, the actuating mechanism 20 comprises a controllable actuator 25 and a system of connecting rods.

The system of connecting rods comprises a vertically movable transverse axle 26 connected to the controllable actuator 25 and at least one connecting rod 27, there being four of them in the present example.

A first end of the connecting rod 27 is pivotably connected to the transverse axle 26 and a second end of the connecting rod 27 is pivotably connected to an aspiration element 17a, 17b, 18a, 18b.

In the example, each aspiration element 17a, 17b, 18a, 18b is connected to the transverse axle 26 by a respective connecting rod 27, the transverse axle 26 passing through cylindrical openings of the first ends of the connecting rods 27. The second ends of the connecting rods 27 are pivotably mounted on the supports 23, for example by means of pivots.

The connecting rods 27 are all of the same dimension, which enables a simultaneous displacement of the same amplitude for the support bars 21, 22 toward each other or away from each other.

In operation, the lowering of the transverse axle 26 inclines the connecting rods 27 toward the horizontal, moving the first aspiration elements 17a, 17b away from the second aspiration elements 18a, 18b. On the other hand, the raising of the transverse axle 26 straightens out the connecting rods 27, closing the V-shaped opening between the connecting rods 27, which brings the first aspiration elements 17a, 17b closer to the second aspiration elements 18a, 18b.

The controllable actuator 25 comprises for example an electric motor.

The actuating mechanism 20 comprises for example a screw 28 designed to be driven in rotation by the electric motor, the screw 28 being inserted vertically in a thread of the transverse axle 26, perpendicular to the latter.

The screw 28 is, for example, a ball screw. Balls inserted between the screw 28 and the transverse axle 26 ensure the rolling function, which allows limiting the friction and achieving rapid movements.

A rotation in a first direction of the electric motor drives the raising of the transverse axle 26 (FIG. 7b) and a rotation in the opposite direction drives the lowering of the transverse axle 26 (FIG. 7a).

According to one exemplary embodiment, the actuating mechanism 20 further comprises at least one guide groove (or slot) 29 designed to cooperate with one end of the transverse axle 26 to guide the vertical displacement of the transverse axle 26. Two guide grooves 29 may thus cooperate with one respective end of the transverse axle 26.

This actuating mechanism 20 is particularly simple to devise and is not very costly.

According to another exemplary embodiment, the actuating mechanism 20 comprises at least one controllable jack, designed to displace at least one aspiration element. The actuating mechanism comprises, for example, two jacks, one end of the movable rod of one jack being secured to a respective support bar 21, 22.

The inserting device 10 may further comprise a control unit 30, such as a computer, a controller, or a microcontroller, comprising a memory and programs making it possible to execute series of instructions enabling in particular a control of the means of controllable displacement 16 and/or the actuating mechanism 20 and/or the creating of the vacuum in the first and second aspiration elements 17a, 17b, 18a, 18b.

According to one exemplary embodiment, the means of controllable displacement 16 comprises a rectilinear guide 31 secured horizontally to a frame and a carriage 32 able to slide along the rectilinear guide 31. The rectilinear guide 31 is, for example, a rail, a rack, or a belt.

The means of controllable displacement 16 likewise comprises an arm 33 extending in the vertical direction, at the end of which is attached the gripping and folding head 15. The arm 33 is able to move vertically in a base carried by the carriage 32.

Controllable motors of the means of controllable displacement 16 are designed to displace the carriage 32 along the rectilinear guide 31 and to displace the arm 33 vertically in the base.

The means of controllable displacement 16 thus allows a control of the vertical displacement of the folding and grasping head 15 on the one hand, above a work station, to lower and grab an insert sheet 11 and lift the insert sheet 11 back up, and on the other hand, above an inserting zone E, to lower the insert sheet 11 into a receptacle 2 and again raise the head 15, having offloaded its insert sheet 11. Likewise, the means of controllable displacement 16 enables a control of the rectilinear horizontal displacement allowing the transport of an insert sheet 11 from the work station to the inserting zone E and the return of the head 15 from the inserting zone E to the work station to grab a new insert sheet 11.

A rolling mat 34 may be provided at the work station to continuously convey stacks of insert sheets 11 (FIG. 5).

FIG. 6 illustrates the different steps of a method for grasping, folding, and loading of an insert sheet 100 by the inserting device 10.

The control unit 30 controls the means of controllable displacement 16 to position the gripping and folding head 16 above an insert sheet 11 laid flat at a work station, the first and second aspiration elements 17a, 17b, 18a, 18b being positioned away from each other in the grasping position (step 101).

Next, the control unit 30 orders the creating of a vacuum in the first and second aspiration elements 17a, 17b, 18a, 18b in order to grasp the insert sheet 11, the grasping position allowing the grasping of the insert sheet 11 by suction in the area of the side flaps 13*a*, 13*b* (step 102).

Next, the control unit 30 controls the means of controllable displacement in a rectilinear vertical displacement to raise the gripping and folding head 16, then in a rectilinear horizontal displacement to direct it to the inserting zone E where an empty and open receptacle 2 has been delivered by the conveyor of receptacles 5 (step 103).

The control unit 30 then orders the rotation of the electric motor to raise the transverse axle 26 (FIG. 7*b*) and thus straighten out the connecting rods 27. The first and second aspiration elements 17*a*, 17*b*, 18*a*, 18*b* slide toward each other on the linear elements 19*a*, 19*b*, bringing the first aspiration elements 17*a*, 17*b* and the second aspiration elements 18*a*, 18*b* closer together, which enables the folding of the insert sheet 11 which has been grasped (FIG. 9, step 104).

This folding may be done in flight, that is, during the transport of the insert sheet 11 to the inserting zone E and especially during the horizontal displacement of the gripping and folding head 15.

The control unit 30 then orders the means of controllable displacement 16 to vertically lower the gripping and folding head 16 into the receptacle 2 (step 105).

Figure 3C:
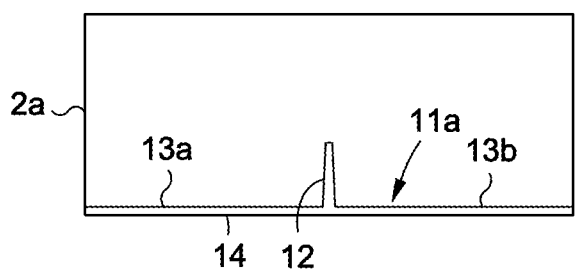
FIG. 3c shows a view similar to FIG. 3a in which the folding boxes have been removed.

The vacuum is maintained in the aspiration elements 17*a*, 17*b*, 18*a*, 18*b* until such time as the head 15 has placed the insert sheet 11 on the bottom of the receptacle 2. The control unit 30 then orders the halting of the vacuum to release the insert sheet 11 (step 106). A stream of air may optionally be injected to facilitate the freeing and the setting down of the insert sheet 11. The insert sheet 11 remains folded in the receptacle 2 with the planar fold 12 maintained vertically by cooperation of the bottom 14 and the side flaps 13*a*, 13*b* (FIG. 3*c*).

The control unit 30 then orders the raising of the gripping and folding head 15 and controls a rotation in the opposite direction of the electric motor to lower the transverse axle 26, the lowering of the latter being guided by the guide grooves 29. The lowering of the transverse axle 26 inclines the connecting rods 27 toward the horizontal, moving the first aspiration elements 17*a*, 17*b* away from the second aspiration elements 18*a*, 18*b*.

This control in the grasping position may be realized in flight, during the vertical raising of the gripping and folding head 15.

The receptacle 2 containing a folded insert sheet 11 may then be delivered by the conveyor of receptacles 5 along the delivery section La up to the filling zone B where it can receive folding boxes 3 having been delivered by the box transporter-filler 4.

The inserting may thus be done automatically, at elevated tempo and without the need for a worker. The insert sheets 11 may thus be folded quickly and correctly to be placed in the proper direction in the receptacles 2.

Even though the figures show a gripping and folding head 15 having two first aspiration elements 17*a*, 17*b* and two second aspiration elements 18*a*, 18*b* and the actuating mechanism 20 is designed to likewise displace the second aspiration elements 18*a*, 18*b*, other embodiments are conceivable.

For example, the gripping and folding head 15 may comprise only a single first aspiration element 17*a*, a single second aspiration element 18*a*, 18*b*, and thus a single linear element 19*a* on which at least the first aspiration element 17*a* is mounted to move by sliding. This embodiment may be suitable, for example, in the case of insert sheets 11 of small format, the aspiration openings and/or suction cups having contact surfaces of sufficient dimensions for firmly grasping the insert sheet 11.

According to another example, the actuating mechanism 20 is designed to displace only one or more of the first aspiration elements 17*a*, 17*b* with respect to one or more second aspiration elements 18*a*, 18*b*, which remain fixed. This embodiment may be of interest for an insert sheet 11 whose planar fold 12 is asymmetrical.

According to yet another exemplary embodiment, the gripping and folding head 15 comprises at least one first aspiration element 17*a*, 17*b*, at least one second aspiration element 18*a*, 18*b* and at least one third aspiration element. The actuating mechanism 20 is then designed to displace the first and the third aspiration elements by sliding on the at least one linear element 19*a*, 19*b* with respect to the second aspiration element, which is central and fixed. This embodiment may be of interest for an insert sheet 11 folded with two parallel planar folds 12.

The invention claimed is:

1. A gripping head for insert sheets for inserting in a receptacle, the insert sheets being sheets of cardboard that are creased to preform at least three folding lines, the gripping head comprising:
    at least two first aspiration elements configured to grasp an insert sheet;
    at least two second aspiration elements configured to grasp the insert sheet;
    a first linear element on which a first one of the at least two first aspiration elements and a first one of the at least two second aspiration elements are mounted and able to slide;
    a second linear element on which a second one of from the at least two first aspiration elements and a second one of the at least two second aspiration elements are mounted and able to slide; and
    a controllable actuating mechanism configured to displace the at least two first aspiration elements and the at least two second aspiration elements by sliding on the first linear element and the second linear element into a grasping position, the grasping position being the at least two first aspiration elements and the at least two second aspiration elements positioned at a spacing from each other in order to grasp the insert sheet,
    wherein the at least two first aspiration elements are connected by a first support bar, and the at least two second aspiration elements are connected by a second support bar,
    the controllable actuating mechanism comprises a controllable actuator and a system of connecting rods, the system of connecting rods including:
        a transverse axle connected to the controllable actuator, the transverse axle being vertically movable, and
        at least two connecting rods, each of the at least two connecting rods having:
            a first end pivotably connected to the transverse axle, and
            a second end pivotably connected to one of the at least two first aspiration elements or one of the at least two second aspiration elements,
    the controllable actuator is configured to:
        lower the transverse axle to pivot the at least two connecting rods, thereby sliding the at least two first aspiration elements and the at least two second aspiration elements along the first linear element and the second linear element away from each other, and raise the transverse axle to pivot the at least two connecting rods, thereby sliding the at least two first aspiration elements and the at least two second aspiration elements along the first linear element and the second linear element closer to each other, thereby enabling folding of a grasped insert sheet.

2. The gripping head of claim 1, wherein the controllable actuating mechanism is further configured to displace the at least two first aspiration elements and the at least two second aspiration elements between:
the grasping position, and
a folding position, the folding position being the at least two first aspiration elements and the at least two second aspiration elements positioned closer together as compared to the grasping position to fold the insert sheet.

3. The gripping head of claim 1, wherein the controllable actuator comprises an electric motor, and
the controllable actuating mechanism further includes a screw configured to be driven in rotation by the electric motor, the screw being inserted into a thread of the transverse axle such that a rotation in a first direction of the electric motor causes a raising of the transverse axle and a rotation in an opposite direction causes a lowering of the transverse axle.

4. The gripping head of claim 1, wherein the controllable actuating mechanism further includes at least one guide groove configured to cooperate with one end of the transverse axle to guide a vertical displacement of the transverse axle.

5. An inserting device for insert sheets comprising a gripping head as claimed in claim 1.

6. The inserting device of claim 5, comprising a means of controllable displacement designed to displace the gripping head at least in a vertical movement and in a horizontal movement.

7. The inserting device of claim 6, comprising a control unit designed to control the means of controllable displacement, the controllable actuating mechanism, and/or a creating of a vacuum in the at least two first aspiration elements and the at least two second aspiration elements of the gripping head.

8. The gripping head of claim 1, wherein the at least two first aspiration elements have first aspiration openings, and the least two second aspiration elements have second aspiration openings,
the first support bar has a first duct connecting the first aspiration openings, and
the second support bar has a second duct connecting the second aspiration openings.

9. The gripping head of claim 8, wherein the first duct has a first common connection on the first support bar, and the second duct has a second common connection on the second support bar, to which respective flexible hoses are connectable so that a pump can create a vacuum for the at least two first aspiration elements and the least two second aspiration elements.

10. A filling station for filling of receptacles with folding boxes, comprising an inserting device for insert sheets as claimed in claim 5.

11. A method of grasping, folding and loading of an insert sheet by an inserting device as claimed in claim 5, wherein:
the gripping head is positioned above the insert sheet, the at least two first aspiration elements and the at least two second aspiration elements being positioned in the grasping position,
a vacuum is created in the at least two first aspiration elements and the at least two second aspiration elements to grasp the insert sheet,
the gripping head is lifted and directed toward a receptacle,
at least the at least two first aspiration elements are slid so as to position the at least two first aspiration elements in a folding position so as to fold the insert sheet to form a folded insert sheet,
the gripping head carrying the folded insert sheet is positioned in the receptacle, and
the vacuum is curtailed in the at least two first aspiration elements and the at least two second aspiration elements so as to release the folded insert sheet in the receptacle.

12. The method of claim 11, wherein the folding of the insert sheet is accomplished during transporting of the insert sheet to the receptacle.

* * * * *